US007809283B2

United States Patent
Hahin et al.

(10) Patent No.: US 7,809,283 B2
(45) Date of Patent: Oct. 5, 2010

(54) MULTI-TRANSCEIVER MODULE CONTROL WITH SINGLE MICROCONTROLLER

(75) Inventors: Jayne C. Hahin, Cupertino, CA (US); Gerald L. Dybsetter, Scotts Valley, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 1174 days.

(21) Appl. No.: 11/261,274

(22) Filed: Oct. 28, 2005

(65) Prior Publication Data

US 2006/0093373 A1    May 4, 2006

Related U.S. Application Data

(60) Provisional application No. 60/623,333, filed on Oct. 29, 2004.

(51) Int. Cl.
*H04B 10/04* (2006.01)
(52) U.S. Cl. .......................... 398/195; 398/138
(58) Field of Classification Search .............. 398/135, 398/138, 164, 195
See application file for complete search history.

(56) References Cited

U.S. PATENT DOCUMENTS

| | | | |
|---|---|---|---|
| 4,571,506 A * | 2/1986 | Lisco | 327/109 |
| 4,709,416 A * | 11/1987 | Patterson | 398/197 |
| 7,215,891 B1* | 5/2007 | Chiang et al. | 398/137 |
| 2004/0076119 A1* | 4/2004 | Aronson et al. | 370/249 |
| 2005/0008280 A1* | 1/2005 | Howley | 385/14 |
| 2005/0084269 A1* | 4/2005 | Dallesasse et al. | 398/135 |
| 2005/0244163 A1* | 11/2005 | Hofmeister et al. | 398/135 |
| 2006/0067688 A1* | 3/2006 | Inman et al. | 398/45 |
| 2006/0090081 A1* | 4/2006 | Baentsch et al. | 713/189 |

OTHER PUBLICATIONS

Abe et al.; SFF and SFP Optical Transceivers. Fujikura Technical Review, 2003; pp. 11-15 [online], [retrieved on Aug. 2, 2008]. Retrieved from the Internet <URL: http://www.fujikura.co.jp/00/gihou/gihou32e/pdf32e/32e_03.pdf>.*

* cited by examiner

*Primary Examiner*—Nathan M Curs
(74) *Attorney, Agent, or Firm*—Workman Nydegger

(57) ABSTRACT

An optical transmit and receive circuit that includes a single control module that controls the transmit and receive operational behaviors in multiple transmit and receive data paths of the optical transmit and receive circuit. By having a single control module control operational behaviors of multiple electro-optic transducer drivers, and multiple post-amplifiers, the size of the overall combination may be reduced.

21 Claims, 2 Drawing Sheets

MULTI-TRANSCEIVER MODULE CONTROL WITH SINGLE MICROCONTROLLER

CROSS-REFERENCE TO RELATED APPLICATIONS

This application claims the benefit of U.S. Provisional Application No. 60/623,333, filed Oct. 29, 2004, which is incorporated herein by reference in its entirety.

BACKGROUND OF THE INVENTION

1. The Field of the Invention

The present invention relates generally to optical transmit and receive circuits such as an optical transceiver. More specifically, the present invention relates an optical transmit and receive circuit having multiple transmit and receive paths controlled by a single controller.

2. The Relevant Technology

Computing and networking technology have transformed our world. As the amount of information communicated over networks has increased, high speed transmission has become ever more critical. Many high speed data transmission networks rely on optical transmit and receive circuits such as optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by optical transmit and receive circuits to aid in the control of the optical transmit and receive components, as well as the processing of various data and other signals. For example, such optical transmit and receive circuits typically include a driver (e.g., referred to as a "laser driver" when used to drive a laser signal) configured to control the operation of the optical transmitter in response to various control inputs. The optical transmit and receive circuits also generally includes an amplifier (e.g., often referred to as a "post-amplifier") configured to perform various operations with respect to certain parameters of a data signal received by the optical receiver. A controller circuit (hereinafter referred to as the "controller") controls the operation of the laser driver and post amplifier.

The various components of the optical transmit and receive circuits are often implemented as Transmit Optical SubAssembly (TOSA) and Receiver Optical SubAssembly (ROSA) pairs. Each TOSA and ROSA pair typically has its own controller for controlling the operation of the laser driver and post-amplifier of the pair. Each TOSA and ROSA pair is generally implemented in a host computing system.

Most host computing systems have limited space. However, as the speed and complexity of optical networks increases, there is a corresponding need to increase the number of TOSA and ROSA pairs supported by a single host. Unfortunately, the use of a single controller for each TOSA and ROSA pair uses valuable host space, thereby limiting the number TOSA and ROSA pairs that a single host can accommodate. One solution to this has been to use larger hosts or to use multiple hosts. However, this is very expensive. In addition, larger hosts may be impractical for many networking applications in which space is at a premium.

Therefore, what would be advantageous is to further increase the number of TOSA and ROSA pairs supported by a single host, while advantageously keeping the size of the host small.

BRIEF SUMMARY OF THE INVENTION

The forgoing problems with the prior state of the art are overcome by the principles of the present invention. The principles of the present invention relate to an optical transmit and receive circuit, such as an optical transceiver, having multiple transmit and receive paths controlled by a single control module.

Each of the multiple transmit and receive paths comprise a Transmit Optical SubAssembly (TOSA) and a Receiver Optical SubAssembly (ROSA) The TOSA, consisting of an electro-optic transducer driver and an electro-optic transducer, is configured to convert electrical signals into optical signals. The ROSA, on the other hand, consisting of an optoelectronic transducer and a post-amplifier, is configured to convert an optical signal into an electrical signal.

The single control module is configured to control the multiple TOSA and the ROSA pairs. Specifically, the single control module is connected to the various electro-optic transducer drivers so as to control the transmit operational behavior of the electro-optic transducers. Additionally, the single control module is connected to the various post-amplifiers so as to control the receive operational behavior of the optoelectronic transducers.

Advantageously, the use of a single controller cuts down on the amount of host space used by the TOSA and ROSA pairs. This allows for a greater number of TOSA and ROSA pairs to be supported by a single host. There is no corresponding need to increase the size of the host for networks requiring an increased number of TOSA and ROSA pairs. This is especially helpful in networks where space is at a premium. In addition, costs may be lowered as only one control module need be implemented instead of multiple control modules.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an optical transmit and receive circuit that includes a single control module that controls the transmit and receive operational behaviors in multiple transmit and receive data paths of the optical transmit and receive circuit. By having a single control module control operational behaviors of multiple electro-optic transducer drivers, and multiple post-amplifiers, the size of the overall combination may be reduced.

Figure 1:
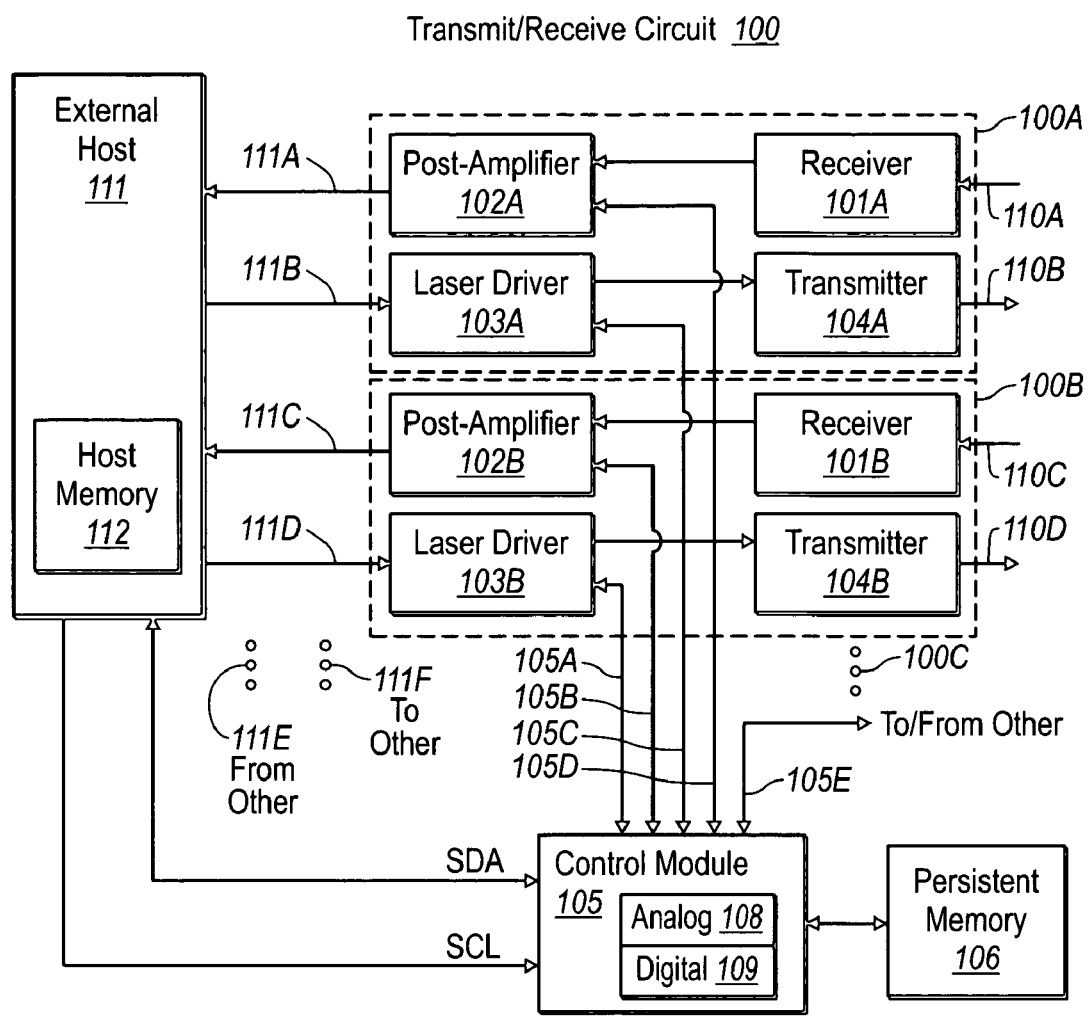
FIG. 1 schematically illustrates an example of a transmit and receive circuit that may implement features of the present invention.

FIG. 1 illustrates an optical transmit and receive circuit 100, such as an optical transceiver module, in which the principles of the present invention may be employed. While the optical transmit and receive circuit 100 will be described in some detail, the optical transmit and receive circuit 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction.

Transmit and receive circuit 100 includes combined Transmit Optical SubAssembly and Receiver Optical SubAssembly pairs (hereinafter referred to as "optical path pair circuits") 100A and 100B. There may also be any number of additional optical path pair circuits as represented by the vertical ellipses 100C. Each optical path pair circuit may transmit and receive optical signals. Transmit and receive circuit 100 also includes a control module 105 that may be used to control the individual optical path pair circuits. Transmit and receive circuit 100 may include a persistent memory 106 for storage of operational microcode.

Transmit and receive circuit 100 may be implemented in several different configurations. For example, transmit and receive circuit 100 may be implemented as a single module, with control module 105 and optical path pair circuits 100A, 100B, and potentially 100C residing in a single encasing. Alternatively, optical path pair 100A, 100B, and potentially 100C may be implemented as separate modules with their own encasing as illustrated by the dashed lines in FIG. 1. In that case, control module 105 may be directly mounted to a circuit board or other means within external host 111. In a third possible embodiment, control module 105 and optical path pair circuits 100A, 100B, and potentially 100C may be individual chip sets that are mounted directly to a circuit board or other means within external host 111 without any encasing. There may also be additional ways to implement transmit and receive circuit 100. It will be appreciated by those skilled in the art that the exact implementation is unimportant to the principles of the present invention.

The optical path pair circuit 100A receives an optical signal 110A from an optical fiber using optoelectronic transducer 101A. Hereinafter, an optoelectronic transducer will also be referred to simply as a "receiver". The receiver 101A acts as an optoelectric transducer by transforming the optical signal into an electrical signal. The receiver 101A provides the resulting electrical signal to a post-amplifier 102A. The post-amplifier 102A amplifies the signal and provides the amplified signal to the host 111 as represented by arrow 111A. The external host 111 may be any computing system capable of communicating with the optical transceiver 100. The external host 111 may contain a host memory 112 that may be a volatile or non-volatile memory source.

The optical path pair circuit 100A may also receive electrical signals from the host 111 for transmission onto the optical transmit fiber. Specifically, an electro-optical transducer driver 103A receives the electrical signal as represented by the arrow 111B, and drives the electro-optical transducer 104A with signals that cause the electro-optical transducer 104A to emit onto the optical transmit fiber optical signals 110B representative of the information in the electrical signal provided by the host 111. Hereinafter, an electro-optical transducer will also be referred to simply as a "transmitter". The transmitter may be, for example, a laser or Light Emitting Diode (LED). Since lasers are in common usage, an electro-optic transducer driver may also be referred to as a "laser driver" to reflect this common usage. In some embodiments, the laser driver 103A and the post-amplifier 102A may be integrated on a single chip. In other embodiments, the laser driver 103A and the post-amplifier 102A are on separate chips.

The optical path pair circuit 100B may be similarly configured. Specifically, the optical path pair circuit 100B receives an optical signal 110C from an optical receive fiber using receiver 101B. The receiver 101B acts as an optoelectric transducer by transforming the optical signal into an electrical signal. The receiver 101B provides is z the resulting electrical signal to a post-amplifier 102B. The post-amplifier 102B amplifies the signal and provides the amplified signal to the host 111 as represented by arrow 111C.

The optical path pair circuit 100B may also receive electrical signals from the host 111 for transmission onto an optical transmit fiber. Specifically, the laser driver 103B receives the electrical signal as represented by the arrow 111D, and drives the transmitter 104B (e.g., a laser or Light Emitting Diode (LED)) with signals that cause the transmitter 104B to emit onto the optical transmit fiber optical signals 110D representative of the information in the electrical signal provided by the host 111. Accordingly, the transmitter 104B also serves as an electro-optic transducer.

As previously mentioned, transmit and receive circuit 100 may have any number of additional optical path pair circuits as represented by vertical ellipses 100C. These additional optical path pair circuits also may include a transmit path with a laser driver and a transmitter and a receive path with a post-amplifier and a receiver with the same functionality as described for optical path pair circuits 100A and 100B. The host 111 may receive data from these other optical path pair circuits 100C as represented by the vertical ellipses 111E, and may transmit data to these other optical path pair circuits 100C as represented by the vertical ellipses 111F.

Figure 2:
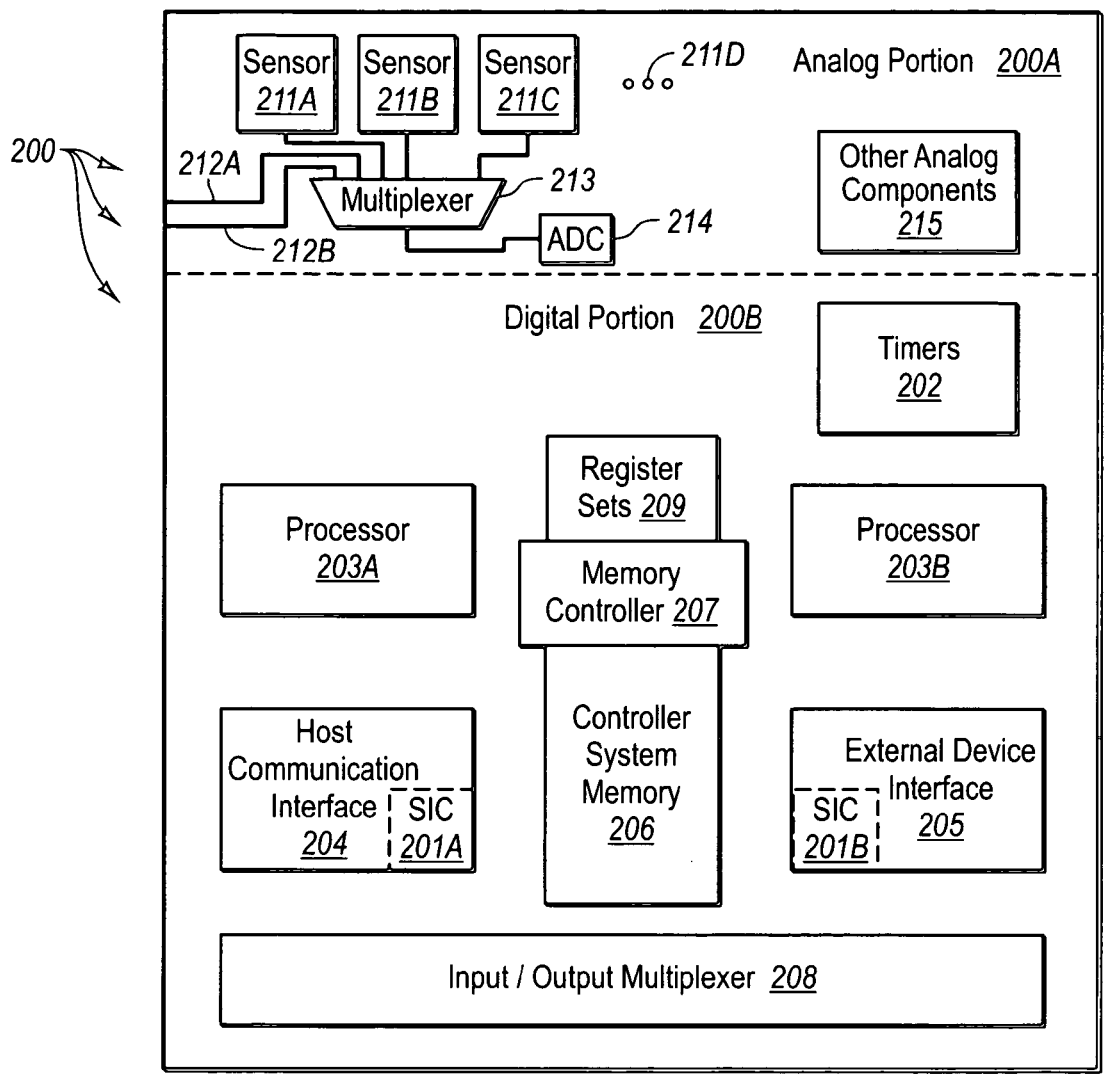
FIG. 2 schematically illustrates an example of a control module of FIG. 1.

Transmit and receive circuit 100 also includes a control module 105 that controls operational behavior for all of the optical path pair circuits 100A, 100B, and potentially others 100C. The control module 105 includes both an analog portion 108 and a digital portion 109. Together, they allow the control module to implement logic digitally, while still largely interfacing with the rest of the transmit and receive circuit 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transmit and receive circuit temperature. The control module may also receive external analog or digital signals from other components within the transmit and receive circuit 100 that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. The externally provided signals may be from both optical path pair circuits 100A and 100B, or the signals may all be from a single optical path pair circuit. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value, whether from the same optical path pair circuit or from multiple optical path pair circuits, may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transmit and receive circuit 100 such as, for example, the post-amplifiers 102A and 102B, the laser drivers 103A and 103B, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transmit and receive circuit 100. Alternatively, the registers may hold data selecting operational parameters for comparison. Additionally, the registers may be memory mapped to the various components of the optical transmit and receive circuit 100 for controlling aspects of the component such as laser bias current or transmit power of the various optical path pair circuits.

The control module 105 may have access to a persistent memory 106, which in one embodiment, is an Electrically Erasable and Programmable Read Only Memory (EEPROM). Persistent memory 106 may also be any other non-volatile memory source. Persistent memory 106 may store microcode that is used by the control module 105 to control operation of transmit and receive circuit 100. For example, persistent memory 106 may contain microcode that begins the transmit and receive circuit 100 boot process. In addition, persistent memory 106 may store microcode that implements specific transmit and receive circuit 100 operational functions when executed by control module 105. In some embodiments, control module 105 and persistent memory 106 are integrated on the same chip.

The behavior of the receivers 101A and 101B, the post-amplifiers 102A and 102B, the laser drivers 103A and 103B, and the transmitters 104A and 104B may vary dynamically due to a number of factors. For example, temperature changes, power fluctuations, and feedback conditions may each affect the performance of these components. Accordingly, control module 105 is communicatively coupled to the post-amplifiers 102A and 102B and the laser drivers 103A and 103B. Control module 105 may also be coupled to post-amplifiers and laser drivers of other transmit path pair circuit 100C. In this description and in the claims, "communicatively coupled" is defined as being capable of communicating data either one way or bi-directionally. Control module 105 evaluates temperature and voltage conditions and other operational circumstances, and receives information from the post-amplifiers 102A and 102B (as represented by lines 105B and 105D) and from the laser drivers 103A and 103B (as represented by lines 105A and 105C). The control module 105 may also receive information about the components of other optical path pair circuits 100C as represented by bi-directional arrow 105E.

For example, referring to FIGS. 1 and 2, control module 105 may control the transmit operational behavior of transmitters 104A and 104B. A few examples will be described. However, this should not be read to limit the claims. There may be numerous other ways for control module 105 to control the transmit operational behavior of transmitters 104A and 104B.

In one embodiment, control module 105 may read the transmit power of transmitter 104A. The processors 203 may then determine that the transmit power is too high or too low. To counteract this, the control module 105 may send a signal over line 105C to the laser driver 103A that directs laser driver 103A to adjust the bias current produced by laser driver 103A. This process may be repeated until control module 105 reads a proper transmit power for transmitter 104A.

In like manner, the control module 105 may control the bias current produced by laser driver 103B and thus the transmit power of transmitter 104B. This process is also true of embodiments of transmit and receive circuit 100 that have multiple optical path pair circuits represented by 100C. In some embodiments, control module 105 may read the transmit power and adjust the bias currents of various optical path pair circuits in a round robin fashion using multiplexer 213 as described above.

Control module 105 may also control the extinction ratio of the various optical path pair circuits. Control module 105 may direct laser drivers 103A and 103B to set a first bias current, after which the transmit power of transmitters 104A and 104B may be measured. Control module 105 may then direct laser drivers 103A and 103B to set a second bias current, after which the transmit power of transmitters 104A and 104B may be again measured. The processors 203 may then calculate the extinction ratio using the measured output powers and the process may be repeated until an optimum extinction ratio is achieved.

Referring again to FIGS. 1 and 2, control module 105 may also control the receive operational behavior of receivers 101A and 101B. An example will be described. However, this should not be read to limit the claims. There may be numerous other ways for control module 105 to control the receive operational behavior of receivers 101A and 101B.

Control module 105 may have written in controller system memory 206 or a register in register sets 209 desired receive power levels. Control module 105 may monitor the power of signals received by receivers 101A and 101B. The processors 203 may then compare the measured received power values with the desired receive power values. If the measured value is below the desired value, then control module 105 may direct receivers 101A and 101B and post amplifiers 102A and 102B to adjust the received power. In this way, control module 105 controls the receive operational behavior.

In one embodiment, the above disclosure is implemented within an optical transmit circuit instead of with an optical transmit and receive circuit. In this embodiment, the receivers 101A and 101B, and post-amplifiers 102A and 102B, along with the communication arrows 105B and 105D need not be included. A single control module 105 is still implemented to control the transmit operational behavior of the individual TOSAs. This embodiment is advantageous where data need only be transmitted by the host, and not received. By eliminating components 101A, 101B, 102A, 102B, 105B, and 105D, the cost of manufacture is reduced, and the size of the optical transmit circuit will be reduced as compared to the size of an optical transmit and receive circuit.

In another embodiment, the above disclosure is implemented within an optical receive circuit instead of with an optical transmit and receive circuit. In this embodiment, the transmitters 104A and 104B and laser drivers 103A and 103B, along with the communication arrows 105A and 105C need not be included. A single control module 105 is still implemented to control the receive operational behavior of the individual ROSAs. This embodiment is advantageous where data need only be received by the host, and not transmitted. By eliminating components 103A, 103B, 104A, 104B, 105A, and 105C, the cost of manufacture is reduced, and the size of the optical receive circuit will be reduced as compared to the size of an optical transmit and receive circuit.

Accordingly, the principles of the present invention relate to a transmit and receive circuit that has a single control module for multiple optical path pair circuits. Use of a single control module for multiple optical path pair circuits allows for a smaller host computing system. In addition, in many applications there is an increased demand for more optical transmit and receiver modules per host. There may not be enough room to implement individual modules with separate control modules. The use of a single control module saves valuable host space and allows a user to implement an increased number of multiple optical path pair circuits in the host space. Costs may also be lower as only one control module is implemented. Accordingly, the principles of the present invention are a significant advancement in the art of transmit and receive circuits.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmit and receive circuit comprising the following:
   a first electro-optic transducer;
   a first electro-optic transducer driver coupled to the first electro-optic transducer so as to control optical signals emitted by the first electro-optic transducer;
   a first optoelectronic transducer;
   a first post-amplifier coupled to the first optoelectronic transducer so as to amplify electrical signals received from the first optoelectronic transducer;
   a second electro-optic transducer;
   a second electro-optic transducer driver coupled to the second electro-optic transducer so as to control optical signals emitted by the second electro-optic transducer;
   a second optoelectronic transducer;
   a second post-amplifier coupled to the second optoelectronic transducer so as to amplify electrical signals received from the second optoelectronic transducer;
   a control module communicatively coupled to both the first and second electro-optic transducer drivers, the control module configured so as to control transmit operational behavior of the first and second electro-optic transducers, and communicatively coupled to both the first and second post-amplifiers, the control module also configured so as to control receive operational behavior of the first and second optoelectronic transducers; and a multiplexer configured to periodically sample signals from first and second sensors that sense characteristics of the first and second electro-optic transducers, respectively, wherein the control module is configured to control transmit operational behavior of the first and second electro-optic transducers based at least in part on the periodically sampled signals from the first and second sensors.

2. An optical transmit and receive circuit in accordance with claim 1, wherein the first electro-optic transducer, the first electro-optic transducer driver, the first optoelectronic transducer, and the first post-amplifier reside in a first encasing, and wherein the second electro-optic transducer, the second electro-optic transducer driver, the second optoelectronic transducer, and the second post-amplifier reside in a second encasing.

3. An optical transmit and receive circuit in accordance with claim 2, wherein the control module is directly mounted to a host computing system printed circuit board.

4. An optical transmit and receive circuit in accordance with claim 1, wherein the first electro-optic transducer, the first electro-optic transducer driver, the first optoelectronic transducer, the first post-amplifier, the second electro-optic transducer, the second electro-optic transducer driver, the second optoelectronic transducer, the second post-amplifier and the control module are individual chip sets directly mounted to a host computing system printed circuit board.

5. An optical transmit and receive circuit in accordance with claim 1 further comprising:

a persistent memory coupled to the control module.

6. An optical transmit and receive circuit in accordance with claim 5, wherein the control module and the persistent memory are integrated on the same chip.

7. An optical transmit and receive circuit in accordance with claim 1, wherein at least one of the electro-optic transducers is a laser.

8. An optical transmit and receive circuit in accordance with claim 1 wherein at least one of the electro-optic transducers is a Light Emitting Diode (LED).

9. An optical transmit and receive circuit in accordance with claim 1, wherein the control module receives information from and sends information to the first and second post-amplifiers and the first and second electro-optic transducer drivers.

10. An optical transmit and receive circuit in accordance with claim 1, wherein the control module is configured to control the transmit operational behavior of the first electro-optic transducer by directing the first electro-optic transducer driver to modify a bias current driving the first electro-optic transducer.

11. An optical transmit and receive circuit in accordance with claim 1, wherein the control module is configured to control the transmit operational behavior of the second electro-optic transducer by directing the second electro-optic transducer driver to modify a bias current driving the second electro-optic transducer.

12. An optical transmit and receive circuit in accordance with claim 1, wherein the control module is configured to control the transmit operational behavior of the first electro-optic transducer by calculating an extinction ratio of the first electro-optic transducer.

13. An optical transmit and receive circuit in accordance with claim 1, wherein the control module is configured to control the transmit operational behavior of the second electro-optic transducer by calculating an extinction ratio of the second electro-optic transducer.

14. An optical transmit and receive circuit in accordance with claim 1, wherein the control module is configured to control the receive operational behavior of the first optoelectronic transducer by directing the first post-amplifier to modify the optical transmit and receive circuit receive power.

15. An optical transmit and receive circuit in accordance with claim 1, wherein the control module is configured to control the receive operational behavior of the second optoelectronic transducer by directing the second post-amplifier to modify the optical transmit and receive circuit receive power.

16. An optical transmit and receive circuit in accordance with claim 1, wherein the optical transmit and receive circuit is one of a 1 G laser transceiver, a 2 G laser transceiver, a 4 G laser transceiver, a 8 G laser transceiver, or a 10 G laser transceiver.

17. An optical transmit and receive circuit in accordance with claim 1, wherein the optical transmit and receive circuit is a 10 G or greater laser transceiver.

18. An optical transmit and receive circuit in accordance with claim 1, wherein the optical transmit and receive circuit is one of a XFP laser transceiver, a SFP laser transceiver, or a SFF laser transceiver.

19. An optical transmit and receive circuit in accordance with claim 1, wherein the first electro-optic transducer, the first electro-optic transducer driver, the first optoelectronic transducer, and the first post-amplifier are implemented as a first module, and driver, the second optoelectronic transducer, and the second post-amplifier are implemented as a second module separate from the first module.

20. An optical transmit circuit comprising the following:

a first electro-optic transducer;

a first electro-optic transducer driver coupled to the first electro-optic transducer so as to control optical signals emitted by the first electro-optic transducer;

a second electro-optic transducer;

wherein the second electro-optic transducer, the second electro-optic transducer a second electro-optic transducer driver coupled to the second electro-optic transducer so as to control optical signals emitted by the second electro-optic transducer; and a control module communicatively coupled to both the first and second electro-optic transducer drivers, wherein the control module includes a multiplexer configured to periodically sample signals from first and second sensors that sense characteristics of the first and second electro-optic transducers, respectively, and wherein the control module is configured to control transmit operational behavior of the first and second electro-optic transducers based at least in part on the periodically sampled signals from the first and second sensors.

21. An optical transmit circuit in accordance with claim 20, further comprising:

a third electro-optic transducer; and a third electro-optic transducer driver coupled to the third electro-optic transducer so as to control optical signals emitted by the third electro-optic transducer, wherein the controller is communicatively coupled to the third electro-optic transducer drivers, wherein the multiplexer is configured to periodically sample signals from a third sensor that senses characteristics of the third electro-optic transducer and the control module is configured to control transmit operational behavior of the third electro-optic transducer based at least in part on the periodically sampled signals from the third sensor, and wherein the multiplexer is configured to select signals from each of the three sensors one at a time in a round robin fashion.

* * * * *